(12) United States Patent  
Cook

(10) Patent No.: US 6,481,415 B1
(45) Date of Patent: Nov. 19, 2002

(54) ELECTRONIC THROTTLE CONTROL

(75) Inventor: John Edward Cook, Chatham (CA)

(73) Assignee: Siemens Canada Limited (CA)

( * ) Notice: Subject to any disclaimer, the term of this patent is extended or adjusted under 35 U.S.C. 154(b) by 0 days.

(21) Appl. No.: 09/534,009

(22) Filed: Mar. 24, 2000

Related U.S. Application Data

(60) Provisional application No. 60/126,199, filed on Mar. 25, 1999.

(51) Int. Cl.$^7$ .............................. F16H 21/44; G05G 7/04
(52) U.S. Cl. ........................ 123/400; 123/337; 74/516; 74/20
(58) Field of Search ................................. 123/399, 361, 123/337, 400, 403; 74/504, 469, 516, 518, 20

(56) References Cited

U.S. PATENT DOCUMENTS

| | | | |
|---|---|---|---|
| 3,685,501 A | * 8/1972 | Honda ........................ | 123/378 |
| 3,871,177 A | * 3/1975 | Ridlen ......................... | 60/431 |
| 4,422,242 A | * 12/1983 | Stocker ....................... | 33/533 |
| 5,152,360 A | * 10/1992 | Haefner et al. .............. | 123/342 |
| 5,367,997 A | * 11/1994 | Kawamura et al. ......... | 123/399 |
| 6,086,014 A | * 7/2000 | Bragg, Jr. ..................... | 244/2 |

FOREIGN PATENT DOCUMENTS

| WO | WO 00/58645 | * 10/2000 | ........... F16H/21/44 |

* cited by examiner

*Primary Examiner*—Hieu T. Vo

(57) ABSTRACT

The present invention provides an assembly for providing a variable output torque based upon a constant input force. The assembly includes an actuator for providing a constant input force and at least one link operatively coupled to the actuator and a pivot point such the constant input force is converted to the variable output torque.

17 Claims, 2 Drawing Sheets

ELECTRONIC THROTTLE CONTROL

CROSS REFERENCE TO RELATED APPLICATIONS

This application claims the benefit of the earlier filing date of U.S. Provisional Application No. 60/126,199, filed on Mar. 25, 1999, which is incorporated by reference herein in its entirety.

BACKGROUND OF THE INVENTION

The present invention relates, in general, to mechanical linkages, and has applications in the fields of automotive, general mechanical, and civil engineering. In the field of automotive engineering, the present invention has particular applications in automotive power train engineering and engine throttles.

BACKGROUND OF THE INVENTION

A mechanical linkage having two ends can be used to transfer an input force at one end to an output force at the other end. In applications that require a varying force at the output end of a mechanical linkage, a varying force can be provided at the input end by a variable torque actuator or motor attached to the input end. However, variable torque motors are expensive and can be difficult to operate for providing the desired variable output force. Therefore, in applications that require a varying output force, there is a need for a mechanical linkage system that can provide a varying output force without the use of expensive variable torque motor.

In the field of automotive engineering, engine throttle control typically requires a variable torque motor operatively connected to a throttle valve in an automotive throttle. An automotive throttle for regulating the delivery of intake air to the manifold of an internal combustion engine generally comprises a throttle body with a butterfly valve rotatably mounted within its bore. The configuration of the throttle body and the butterfly valve have been identified as apparently giving rise to mechanical resistances when the valve is close to the bore of the throttle body (i.e. when the valve is nearly fully closed), the plane of the valve approaching perpendicularity relative to the longitudinal axis of the throttle body. The resistances are believed to be due to ice or other contamination that can form in the small clearance between the butterfly valve and the throttle body inside diameter when the valve is nearly fully closed. Furthermore, the pressure drop across the valve approaches its maximum value when the valve approaches the nearly closed position. Therefore, to overcome the above mentioned mechanical resistances of the butterfly valve in the nearly closed position, the butterfly valve can be operatively connected to a variable torque motor. The variable torque motor can be configured to provide a relatively greater amount of torque at the valve nearly closed position than the torque needed at a valve partially or fully opened positions. However, there still remains a need for a throttle control system that can operatively control the butterfly valve in an automotive throttle without the use of expensive variable torque motors.

SUMMARY OF THE INVENTION

The present invention offers a solution to the foregoing problems by providing an assembly for providing a variable output torque based upon a constant input force. The assembly includes an actuator for providing a constant input force and at least one link operatively coupled to the actuator and to a pivot point such the constant input force is converted to the variable output torque.

The present invention also provides an assembly for providing a variable output torque based upon a constant input force. The assembly comprises first and second links each having a first end pivotally mounted about a respective axis and each having a second end operatively coupled together an additional link, each of the first and second links having a different angular orientation relative to an imaginary line extending between the axes; and an actuator driving the first link pivotally about its axis at the constant input such that the second link is driven pivotally about its axis at the variable output.

The present invention also provides an assembly for controlling the position of a throttle valve rotating about a first axis between a first position and a second position. The assembly comprises a motor for moving an actuator between two positions; and at least one link coupling the actuator and to the valve and imparting to the valve a first torque when the valve is in the first position and a second torque when the valve is in the second position, the second torque being less than the first torque.

The present invention also provides a method for controlling the position of a throttle valve. The valve is pivotal about an axis of rotation. The method comprises applying a first torque with an actuator to the valve when the valve is in a first position; and applying a second torque with the actuator to the valve when the valve is in a second position.

The present invention also provides a method for determining the position of a valve in a throttle. The valve is driven by an electric motor and a relationship has been established between the current drawn by the motor and the position of the valve. The method comprises measuring the current drawn by the motor; and determining the position of the valve from an established relationship between the current drawn by the motor and the position of the valve.

BRIEF DESCRIPTION OF THE DRAWINGS

The accompanying drawings, which are incorporated herein and constitute part of this specification, illustrate presently preferred embodiments of the invention and, together with the general description given above and the detailed description given below, serve to explain features of the invention.

DETAILED DESCRIPTION OF THE PREFERRED EMBODIMENTS

Figure 1:
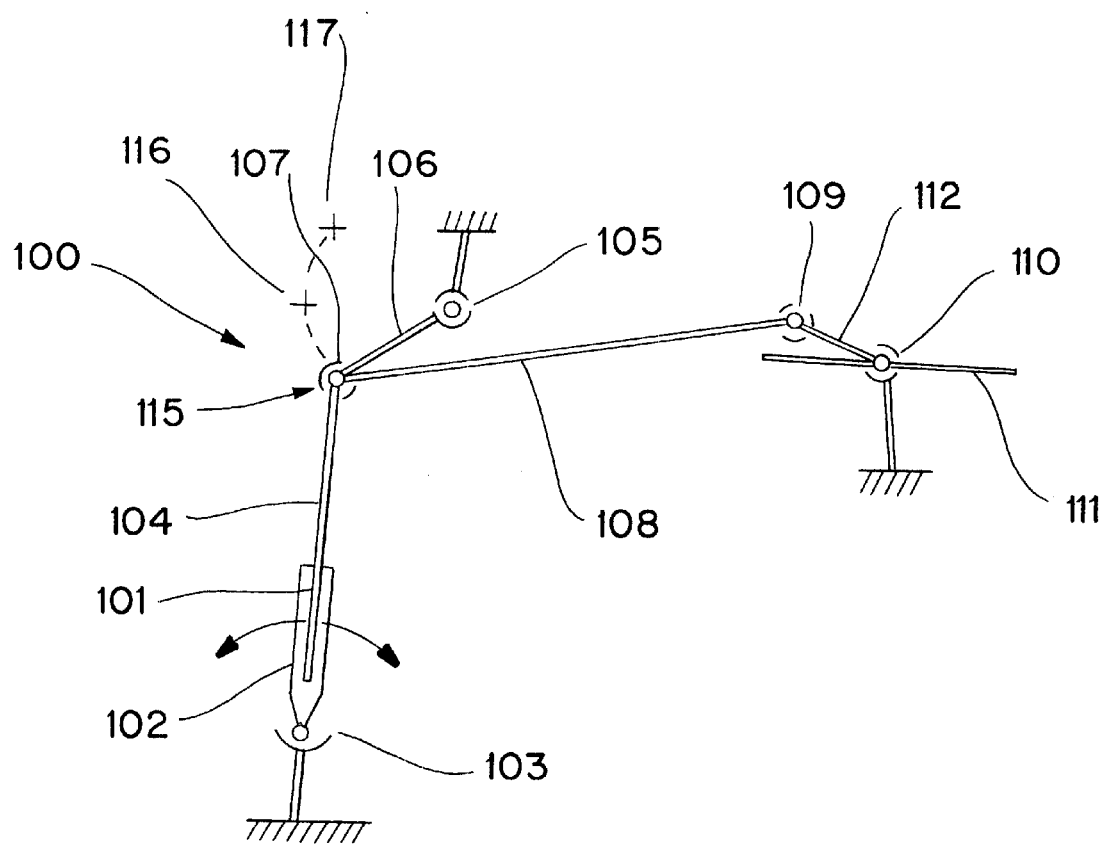
FIG. 1 shows an embodiment of a mechanical linkage for providing a variable output torque based upon a constant input torque.

Referring to FIG. 1, the mechanical linkage assembly 100 according to the present invention includes a linear actuator 102, pivoted about fixed pivot point 103 and operatively connected to a first end of link 104 at location 101. Second end of link 104 is pivotally connected at second ends of links 106 and 108 at pivot point 107. Link 106, is also pivotally mounted at fixed pivot point 105. First end of link 108 is pivotally connected to second end of link 112 at pivot point 109. First end of link 112 is fixedly attached to link 111 at fixed pivot point 110, thereby allowing simultaneous rotation of links 112 and 111 about fixed pivot point 110.

In operation, when a linear upward force is imparted on link 104 by linear actuator 102, a clockwise torque is imparted on link 106 about fixed pivot point 105. Similarly, a clockwise torque is imparted through link 108 onto links 111 and 112 about fixed pivot point 110. As link 104 travels upward by means of the linear actuator 102, it can be seen that because of the fixed locations of pivot points 103, 105 and 110, linear actuator 102 will pivot clockwise about fixed pivot point 103. Additionally, as link 104 travels upward, the overall translation of pivot point 107 to position 116 relative to its original location at position 115 is initially greater in the vertical direction than in the horizontal direction. Therefore, the magnitude of the torque at fixed pivot point 110 is greater when pivot point 107 is at position 115 than that at position 116. For translation from position 116 to position 117, the magnitude of the torque at fixed pivot point 110 is greater when pivot point 107 is at position 116 than that at position 117. Therefore, by providing a linear actuator 104 operatively mounted to two out-of-phase links 106 and 112, a constant input torque about fixed pivot point 105 is transformed into a variable output torque about fixed pivot point 110, without the use of a variable force actuator or a variable torque motor. It should be noted that an angular actuator could be used in place of the linear actuator 102. Similarly a constant torque motor with a rotary shaft could also be used in place of the linear actuator 102 as will be described in detail below.

Figure 2:
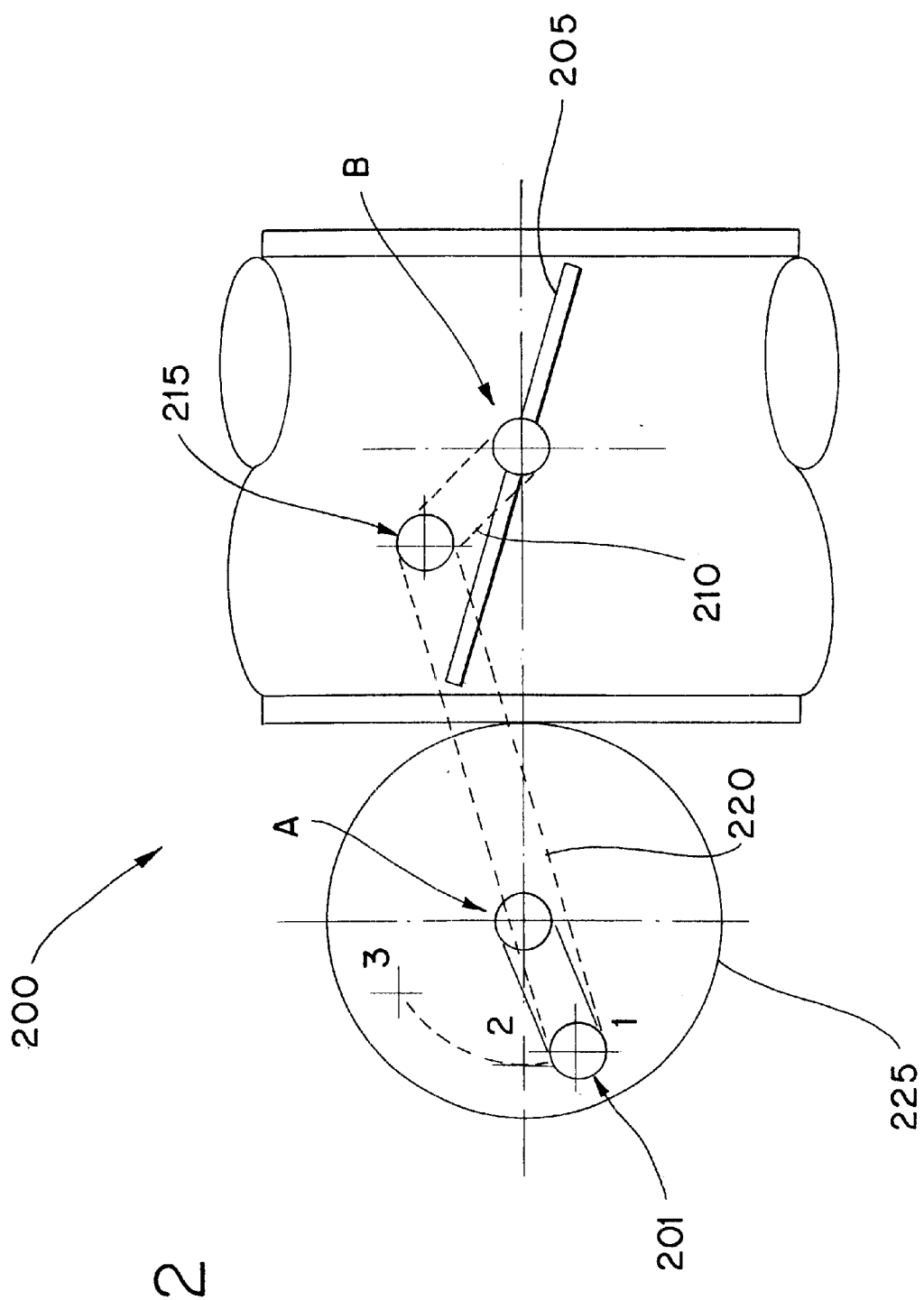
FIG. 2 shows an embodiment of an electronic throttle control assembly according to the present invention.

Referring to FIG. 2, the throttle control assembly 200 according to the present invention includes an electronic torque motor having a shaft with centerline A, and a pivot point 201 offset from and rotating about the centerline A, which torque motor is secured adjacent to a throttle. The throttle includes a butterfly valve 205, which rotates about a centerline B. A fixed crank 210, having a pivot point 215, is coupled to butterfly valve 205. A link 220 of fixed length connects pivot point 215 with pivot point 201. Pivot point 201 is offset from the centerline A of the motor and is fixed to an actuator 225 of the motor.

The range of motion of the electronic throttle control assembly 200 includes three positions of interest. With the pivot point 201 in position 1, the electronic throttle control assembly 200 is in a "limp home position." In this position, in which the assembly 200 will reside when no electrical current is applied to the torque motor, the throttle is partially open, providing a fast idle engine speed only. When the pivot point 201 is moved to position 2, a "hot idle position", the assembly 200 rotates the butterfly valve 205 to provide the minimum airflow through the throttle. When the assembly 200 is moved to position 3, it drives butterfly valve 205 to a vertical position (parallel with the longitudinal axis of the throttle body), such that the assembly 200 and the throttle are in a "wide open throttle position".

The assembly 200 according to the present invention provides an "over-center" link arrangement, which provides a very high force (torque) to the butterfly valve 205 at the point where the valve is close to the bore of the throttle body. Maximum torque is required at this point to overcome ice/contamination, which can form between the small clearance between the butterfly valve 205 and throttle body inside diameter when the assembly 200 is in this position. Also, when the butterfly valve 205 approaches the fully closed position, the pressure drop across it approaches a maximum, resulting in a high force on the butterfly valve 205 and the shaft.

In addition to the over-center link according to the present invention providing high torque when required, the over-center link also allows the available torque to diminish as it becomes less necessary. Specifically, when butterfly valve 205 is in the wide open throttle position, minimal contact is possible between the butterfly valve 205 and the inside diameter of the throttle body. Also, as the butterfly valve 205 approaches the wide open throttle position 3, the pressure drop across the valve approaches zero, under which condition the forces acting on the mechanism of butterfly valve 205 are minimal.

An additional inventive feature of the assembly 200 according to the present invention provides a valuable redundant means of determining the position of the throttle, supplemental to the information provided directly by the throttle position sensor (not shown). Specifically, there is an accurate correlation between the electrical current draw by the torque motor and the signal output of a position sensor (not shown) typically attached to the throttle shaft. Thus the torque motor current can be measured, recorded and continuously updated in the engine control module (not shown) and compared with the shaft position sensor output to detect the failure of either means of measuring position. This inventive feature is not limited to application in the context of the illustrated embodiment, not even to torque motors, but rather is applicable to electronically controlled throttles generally.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. An assembly for providing a variable output torque based upon a constant input force, the assembly comprising:
   an actuator for providing a constant input force; and
   at least one link operatively coupled to the actuator and to a pivot point such the constant input force from the actuator is converted to the variable output torque at the pivot point, the at least one link includes a first link, a second link, and a third link, each link having respective first and second ends, the first end of the first link is constrained to pivotal movement about a first axis, the second end of the first link is pivotally connected to the first end of the second link, the second end of the second link is pivotally connected to the first end of the third link, the second end of the third link is constrained to pivotal movement about a second axis, and an output element is fixedly connected to the third link for pivotal movement about the second axis.

2. The assembly according to claim 1, wherein the actuator comprises an angular actuator fixedly connected to the first end of the first link and driving the first link pivotally about the first axis.

3. The assembly according to claim 1, wherein the actuator comprises a linear actuator, the linear actuator having a first end pivotally mounted with respect to a fixed pivot and a second end pivotally connected to the first link at a distance from the first end of the first link, the actuator driving the first link pivotally about the first axis.

4. The assembly according to claim 3, wherein the actuator is pivotally connected to the second end of the first link.

5. The assembly according to claim 1, wherein the first link is angularly oriented relative to the second link at a first angle and the third link is angularly oriented relative to the second link at a second angle, the second angle is different than the first angle.

6. The assembly according to claim 1, wherein the first axis is parallel and offset with respect to the second axis.

7. An assembly for providing a variable output torque based upon a constant input force, the assembly comprising:
   first and second links each having a first end pivotally mounted about a respective axis and each having a second end operatively coupled together an additional link, each of the first and second links having a different angular orientation relative to an imaginary line extending between the axes; and
   an actuator driving the first link pivotally about its axis at the constant input such that the second link is driven pivotally about its axis at the variable output the actuator comprises an angular actuator fixedly connected to the first end of the first link and driving the first link pivotally about its axis.

8. An assembly for providing a variable output torque based upon a constant input force, the assembly comprising:
   first and second links each having a first end pivotally mounted about a respective axis and each having a second end operatively coupled together an additional link, each of the first and second links having a different angular orientation relative to an imaginary line extending between the axes; and
   an actuator driving the first link pivotally about its axis at the constant input such that the second link is driven pivotally about its axis at the variable output the actuator comprises a linear actuator, the linear actuator having a first end pivotally mounted with respect to a fixed pivot and a second end pivotaly connected to the first link at a distance from the first end of the first link, the actuator driving the first link pivotally about its axis.

9. The assembly according to claim 8, wherein the actuator is pivotally connected to the second end of the first link.

10. An assembly for providing a variable output torque based upon a constant input force, the assembly comprising:
    first and second links each having a first end pivotally mounted about a respective axis and each having a second end operatively coupled together an additional link, each of the first and second links having a different angular orientation relative to an imaginary line extending between the axes, and the axes are parallel and offset with respect to one another; and
    an actuator driving the first link pivotally about its axis at the constant input such that the second link is driven pivotally about its axis at the variable output.

11. An assembly for controlling the position of a throttle valve rotating about a first axis between a first position and a second position, the assembly comprising:
    a motor for moving an actuator between two positions; and
    at least one link coupling the actuator and to the valve and imparting to the valve a first torque when the valve is in the first position and a second torque when the valve is in the second position, the second torque being less than the first torque, and the first and second torques are imparted to the valve while torque provided by the motor remains substantially constant.

12. The assembly according to claim 11, wherein the motor is a rotary motor, the assembly further comprises a first crank pivotally coupled to the actuator at a point offset from the axis of rotation of the motor, and a second crank coupled to the valve, a first end of the actuator being pivotally coupled to first crank and a second end of the actuator pivotally coupled to the second crank.

13. The assembly according to claim 12, wherein the second crank is fixed to the valve.

14. The assembly according to claim 11, wherein the actuator comprises a first link, a second link and a third link, each having respective first and second ends, the first link is coupled at the first end to the actuator and at the second end to the first end of a second link, a second end of the second link is coupled to the first end of a third link and the third link coupled at a second end to the valve.

15. An assembly for controlling the position of a throttle valve rotating about a first axis between a first position and a second position, the assembly comprising:
    a rotary motor for moving an actuator between two positions;
    at least one link coupling the actuator and to the valve and imparting to the valve a first torque when the valve is in the first position and a second torque when the valve is in the second position, the second torque being less than the first torque;
    a first crank pivotally coupled to the actuator at a point offset from the axis of rotation of the motor;
    a second crank coupled to the valve; and
    a first end of the actuator being pivotally coupled to first crank and a second end of the actuator being pivotally coupled to the second crank.

16. The assembly according to claim 15, wherein the second crank is fixed to the valve.

17. An assembly for controlling the position of a throttle valve rotating about a first axis between a first position and a second position, the assembly comprising:
    a motor for moving an actuator between two positions, the actuator including a first link, a second link and a third link, each having respective first and second ends, the first link is coupled at the first end to the actuator and at the second end to the first end of a second link, a second end of the second link is coupled to the first end of a third link and the third link coupled at a second end to the valve; and
    at least one link coupling the actuator and to the valve and imparting to the valve a first torque when the valve is in the first position and a second torque when the valve is in the second position, the second torque being less than the first torque.

* * * * *